Apr. 17, 1923.

E. D. EDDY 1,452,457

APPARATUS FOR SEPARATING SEEDS

Filed Jan. 31, 1922

INVENTOR.
Edgar. D. Eddy.
By. Fetherstonhaugh Co.
Attys.

Apr. 17, 1923.

E. D. EDDY 1,452,457

APPARATUS FOR SEPARATING SEEDS

Filed Jan. 31, 1922

INVENTOR.
Edgar. D. Eddy.
By. Fetherstonhaug
Attys

Apr. 17, 1923.  1,452,457
E. D. EDDY
APPARATUS FOR SEPARATING SEEDS
Filed Jan. 31, 1922  3 Sheets-Sheet 3

INVENTOR.
EDGAR. D. EDDY.
By. Fitherstonhaugh Co.
Attys.

Patented Apr. 17, 1923.

1,452,457

UNITED STATES PATENT OFFICE.

EDGAR DUNCOMBE EDDY, OF TORONTO, ONTARIO, CANADA.

APPARATUS FOR SEPARATING SEEDS.

Application filed January 31, 1922. Serial No. 533,038.

*To all whom it may concern:*

Be it known that I, EDGAR DUNCOMBE EDDY, of the city of Toronto, in the county of York, in the Province of Ontario, Canada, have invented certain new and useful Improvements in Apparatus for Separating Seeds, of which the following is the specification.

My invention relates to improvements in grain and seed graders and separators and the object of the invention is to devise a machine which will separate heavier seeds from lighter seeds by centrifugal action on the basis of their comparative specific gravities. A further object is to devise a machine that will effect the complete separation of light seeds from the heavier seeds which is impossible in the separators at present in use, and a still further object is to devise means for separating the fertile seeds from the dead seeds.

My invention consists of a machine constructed and arranged all as hereinafter more particularly described and illustrated in the accompanying drawings in which.

Like characters of reference indicate corresponding parts in the different views.

Figure 1:
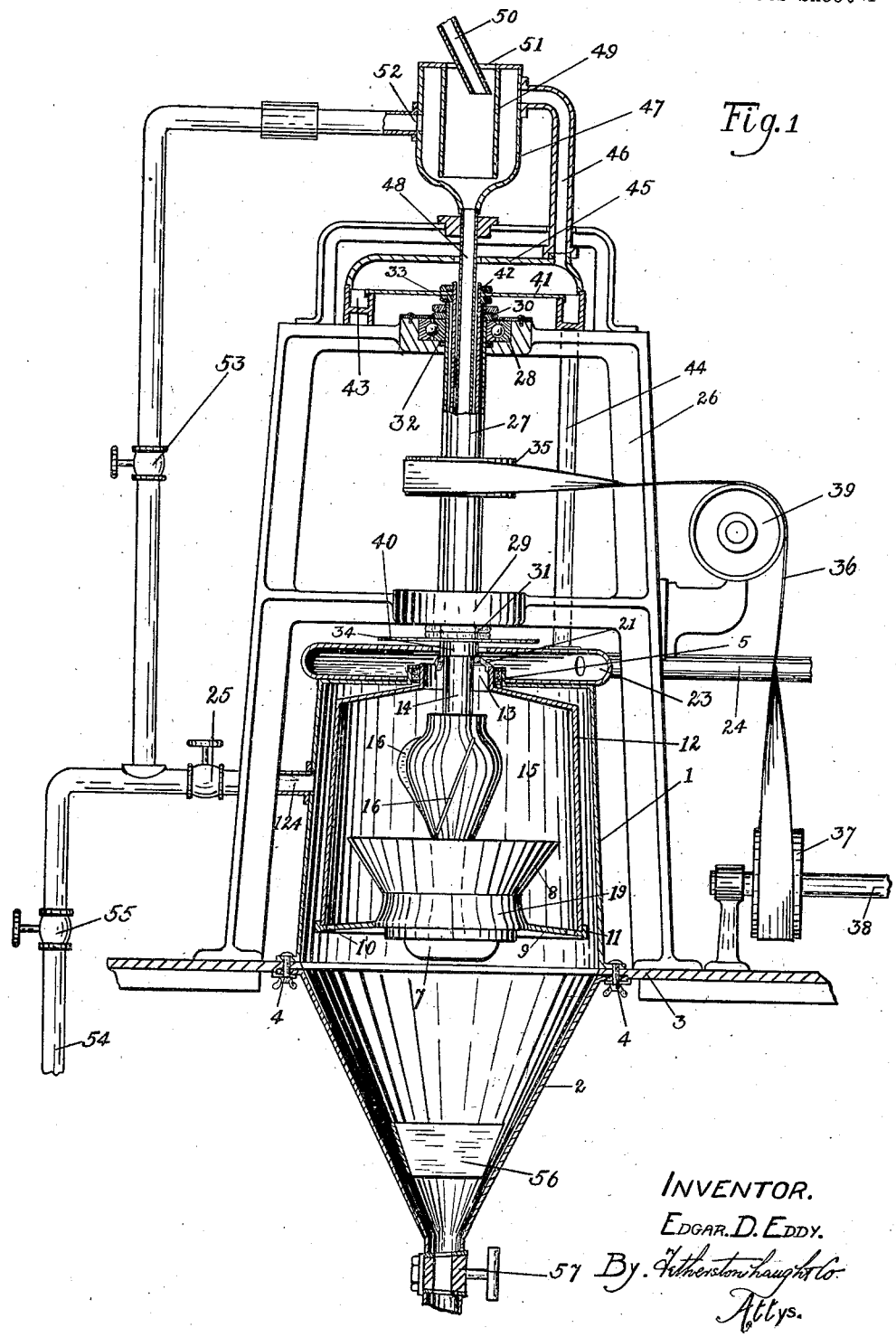
Fig. 1 represents an elevational view of the assembled machine showing certain parts in section.
Figure 2:
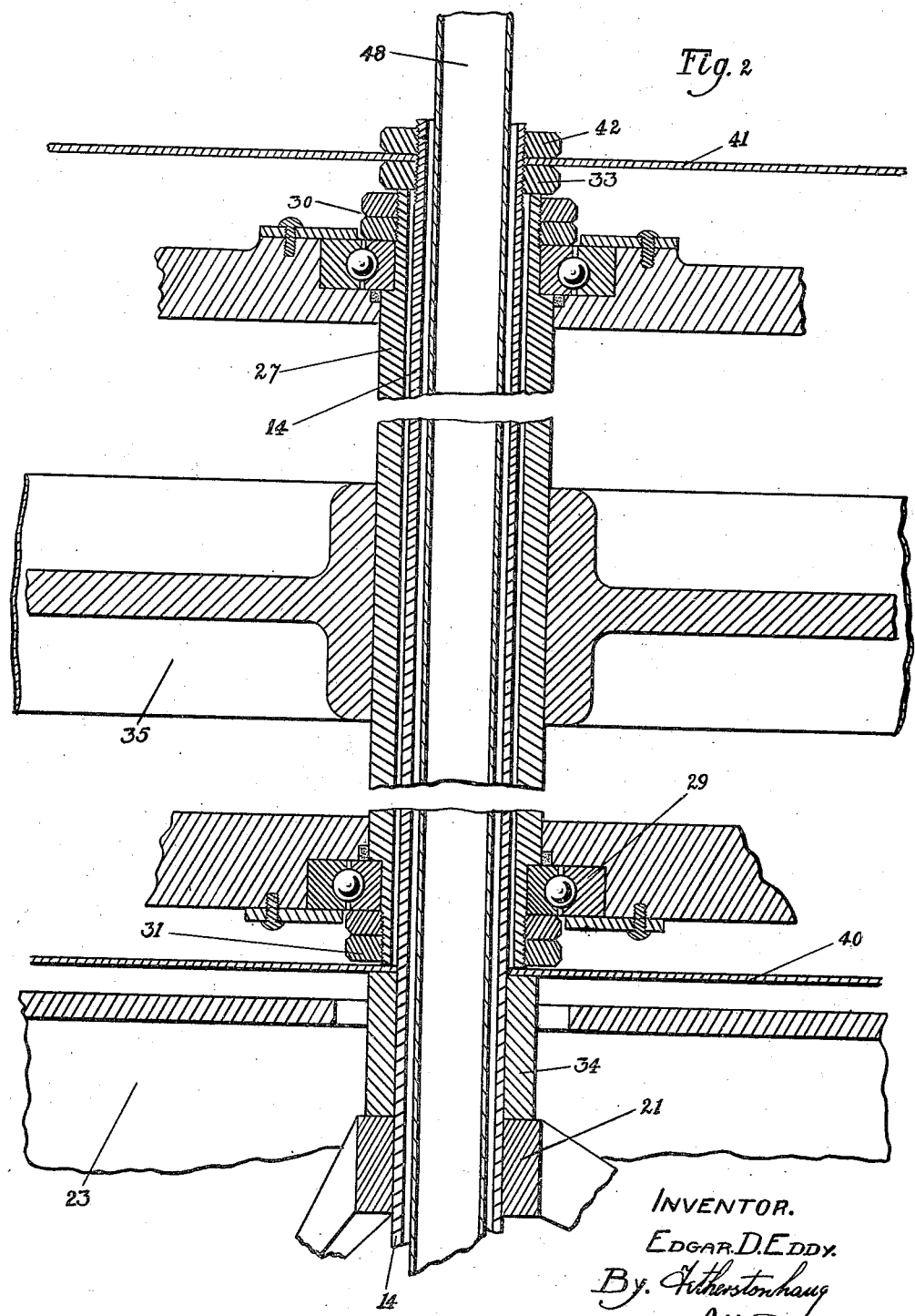
Fig. 2 is an enlarged vertical section through the seed and upper liquid feeding means and also illustrating the driving connection.
Figure 3:
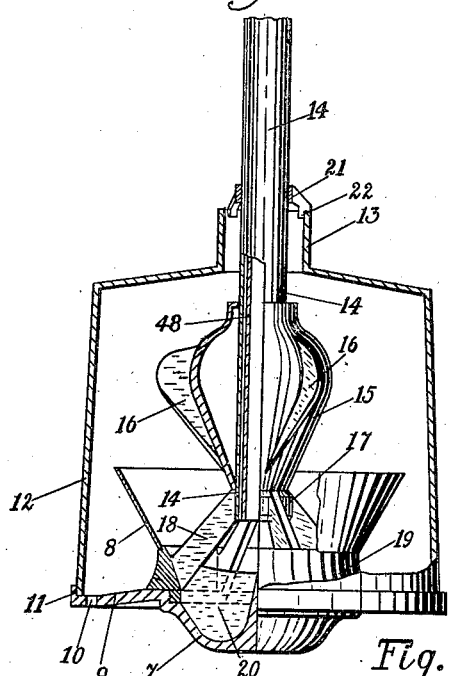
Fig. 3 is a vertical sectional view through the rotor showing on the left side the interior in section, and on the right side, in elevation.

1 is the truncated conical upper portion of the liquid-containing vessel which is provided with an inverted conical shaped lower portion 2 communicating with the upper portion, said portions 1 and 2 suitably mounted on a base 3, the latter portion detachably secured thereto and to the portion 1 by means of the bolts 4. 5 is a stuffing box in the centre of the top of the truncated conical portion 1. The rotor consists of a suitably formed bowl-shaped portion 7 with an upper flaring annular flange 8 and an outwardly extending flange 9 having a plurality of arc-shaped slots 10 in the vicinity of its outer periphery. 11 is the upwardly turned peripheral edge of the flange 9 adapted to centre thereon the truncated conical cover 12 having the upwardly extending reduced neck 13 centrally located in the top thereof.

14 is the driven sleeve extending down through the centre of the neck 13 and through the vertical cone-shaped member 15 provided with the suitably pitched vanes 16 on the exterior thereof. The lower end of the driven sleeve 14 is suitably secured to the spider 17 having the radially and downwardly extending vanes 18 formed integrally with the annular upper portion 19 constituting the upper portion of the rotor, said portion 19 being suitably threaded in the lower portion of the rotor 7. 20 is a vertical diametrically extending vane preferably formed integrally with two oppositely disposed webs 18 on the spider 17 and extending down to the bottom of the lower portion of the rotor 7. 21 is a centering spider extending freely about the driven sleeve 14 and having downwardly extending lips 22 inserted into the top of the neck 13.

The neck 13 extends up through the stuffing box 5 in the upper portion of the casing 1 and into an annular chamber 23 mounted on the top of the portion 1. 24 is a discharge pipe from such chamber for discharging a portion of the liquid from the machine. 124 is a liquid inlet pipe communicating with the interior of the upper portion 1 of the casing, said pipe having a valve 25 therein. 26 is a frame suitably secured to the base 3 and extending up above the upper portion 1 of the casing and being independent thereof. 27 is a vertical driving sleeve mounted in the upper and lower bearings 28 and 29 respectively, situated on the frame, said driving sleeve 27 extending freely over the driven sleeve 14, the upper and lower ends of the sleeve 27 being threaded and provided with the nuts 30 and 31 respectively, said nuts adapted to secure the driving sleeve to the inner ball races 32 of the bearings 28 and 29 in order that such sleeve will revolve freely in the bearings 28 and 29.

The driven sleeve 14 extends up through the sleeve 27 and is provided with a threaded upper end upon which the nut 33 is threaded adapted to bear on the upper end of the sleeve and as a distance collar 34 is inserted between the lower portion of the sleeve 27 and the centering spider 21 it will be seen that a driving connection is constituted between the driven sleeve 14 and the driving sleeve 27. 35 is a pulley on the driving sleeve 27 adapted to be suitably connected by means of the belt 36 with the pulley 37 on a driving shaft 38.

In the drive illustrated in Figure 1 as the driving shaft is horizontal, the belt extends over idler pulleys 39 in order that it will drive the vertical sleeve 27 through the medium of the pulley 35. 40 is a liquid-deflecting disc mounted on the sleeve 14 between the distance collar 34 and the lower end of the sleeve 27, said disc being adapted to revolve with the sleeves.

41 is a disc mounted on the upper end of the sleeve 14 between the nut 33 and the locking nut 42. 43 is an annular trough extending about the upper end of the sleeve 27 and suitably centred relatively thereto, the outer periphery of the disc 41 extending over the inner wall of such trough. The bottom of the trough 43 is suitably sloped towards the discharge pipe 44 which extends downwardly from the trough into the chamber 23. 45 is a cover for said trough and disc, communicating by means of the pipe 46 with the funnel shaped hopper 47. 48 is a depending pipe from the bottom of the funnel shaped hopper 47 extending down through the sleeve 14 into the bottom thereof and adapted to introduce the seeds to be separated and the upper liquid into the bowl-shaped portion of the rotor 6.

49 is a depending annular wall in said hopper extending down in the vicinity of the bottom of the same. 50 is the seed delivery spout which is adapted to extend through an orifice 51 in the top of such hopper so as to introduce the seeds thereinto interiorly of the annular wall 49. 52 is a liquid inlet pipe to the hopper extending down and connected by means of a T with the pipe 124, said pipe 52 having a suitable valve 53 therein. 54 is the main liquid supply pipe provided with the main valve 55.

56 is a suitable baffle-plate extending across the inverted conical portion 2 and 57 is a suitable discharge cock in the bottom of such portion.

Figure 5:
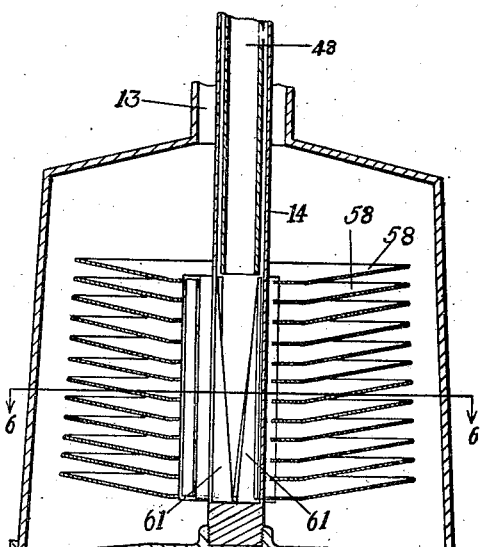
Fig. 5 is an enlarged vertical section illustrating a modified form of rotor.
Figure 4:
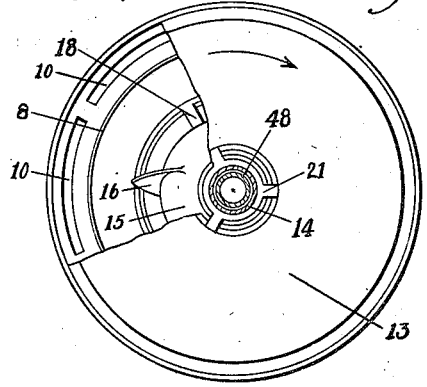
Fig. 4 is a plan view of the rotor showing the top of the same broken away to expose the interior.
Figure 6:
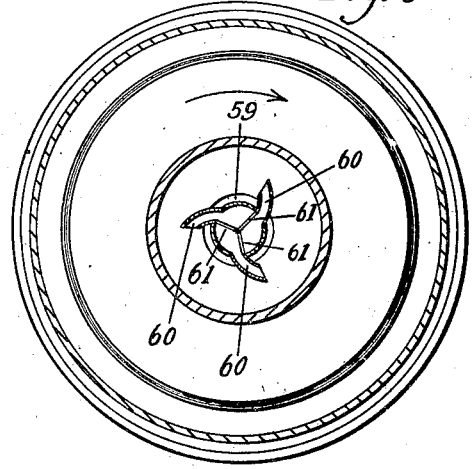
Fig. 6 is a horizontal section through the line 6—6 Figure 5.

In the modified form of rotor illustrated in Figures 5 and 6 the inverted conical member 15, bowl portions 7 and 8 and the spider 17 are replaced by a series of superimposed concentric dished plates 58 having registering central orifices 59, said plates being suitably spaced apart one from the other and secured to the curved projecting members 60 communicating with the interior of the sleeve 14. In this instance the bottom of the sleeve 14 is closed and is suitably secured to the bottom of the rotor.

61 are suitably arranged baffles situated in the lower end of the sleeve 14 for imparting a whirling motion to the downwardly passing liquid and seeds prior to their entering the projecting discharge members 60. Such baffles also assist in dividing the liquid and seeds suspended therein into equal proportions for delivery to the respective discharge members 60.

The machine is operated as follows:—

The brine, or other solution used, is circulated by means of a centrifugal pump, the discharge pipe of which is connected directly to pipe 54. This pump is run at such a speed that sufficient pressure is available to force liquid through the pipe 124 into the casing at any rate desired against the outward pressure of the liquid in the casing due to the centrifugal force developed by the rotor, this rate being controlled by the valve 25.

In starting the machine, valves 57 and 53 are closed, and valves 25 and 55 are opened. This allows liquid under pump pressure to flow through pipe 124, filling the portions of the casing 1 and 2 and the interior of the rotor shell or cover 12 and overflowing through the neck 13, chamber 23 and the pipe 24. The rotor is now revolved at a suitable constant speed by means of the driving connection before described, and the valves 53 and 57 are partially opened.

The sequence of these operations is not material, but the following conditions should be obtained:

The casing 1 and 2 is full of liquid which is continuously discharging through the valve 57 and continuously receiving an approximately equal amount of liquid through the pipe 124. This liquid has a rotary motion due to the friction of the outside of the rotor but limited by the friction on the casing and the continuous introduction of fresh liquid through the pipe 124. This rotary motion is further reduced by a baffle plate 56 so that it is very slight at the discharge valve 57. This liquid has also a strong downward current along the casing from the space surrounding the rotor to the lower valve 57, these two motions combining to produce a spiral current downward past the lower edge of the rotor to the discharge valve 57.

Liquid is also being continuously supplied to the interior of the rotor through valve 53, pipe 52, the hopper 47 and the feed pipe 48. The liquid in the rotor will, due to the centrifugal force developed by its rotation, assume approximately the form of a hollow cylinder; that is the rotor will remain full of liquid from the rotor cover 12 inward to a point slightly nearer the axis than the inner edge of the bowl neck 13, through which the liquid will discharge continuously into the annular chamber 23 and out by the discharge pipe 24. There is thus a continuous current upward along the inner surface of the liquid in the rotor from the lower bowl shaped portion 7 through the neck 13.

As the interior of the rotor communicates with the interior of the casing through the arc shaped slots 10, it will be seen that by varying the feed of the liquid through the valves 25 and 53 with relation to each other and to the discharge valve 57, liquid may be caused to flow continuously through the slots 10 in either direction, either out from the rotor to the casing or vice-versa. Or, as is usually more advisable, this adjustment can be so made that there is no liquid current through these slots, that is, the pipe 124 supplies all the liquid discharging through valve 57 and the pipe 52 through pipe 48 supplies all the liquid discharging through the neck 13 of the rotor and the pipe 24.

A stream of seed is now fed through the pipe 50. This seed falls to the bottom of the feed hopper 47 where it is caught by the stream of liquid from pipe 52 and drops therewith through the stationary pipe 48 to the interior of the rotor. From the bottom of the pipe 48 the stream of liquid with the seed suspended therein falls to the bottom of the bowl-shaped portion 7 where it is thrown outward into the body of the liquid by the vertical vane 20 and the spider arms 18. Centrifugal force acting radially outward forces those seeds which are of greater specific gravity than the liquid outward and upward over the flaring flange 8 to the shell of the rotor 12, the conical form of which causes them to be forced downward through the liquid and out of the rotor through the slots 10. From here they are carried downward by the current in the casing 2 to the discharge valve 57. Those seeds which are of less specific gravity than the liquid are centripetally displaced to the inner surface of the liquid in the rotor where they are carried upward by the current, through the neck 13 and discharged through the chamber 23 and the pipe 24.

The flaring flange 8 has the effect of spreading the heavy seed out into a thin layer and making it possible for any seed to move freely inward if lighter than the liquid. If the heavy seed is allowed to move radially outward in a comparatively solid body some lighter seed may be caught therewith.

The conical member 15 forces all seeds being carried upward by the current along the inner surface of the liquid into the body of the same so as to come under a sufficient amount of pressure to squeeze out any air which may envelop them. It also ensures every seed going far enough from the axis of the rotor for the centrifugal force to be effective in causing separation. Owing to the air envelopes referred to above and to surface tension some of the heavier seeds might be carried upward on the surface of the liquid with the light discharge if it were not for this conical member 15.

Owing to the continuous introduction of fresh liquid and seed, the liquid in the rotor will lag somewhat behind the speed of the rotor. In order to reduce this lag, and hence keep the centrifugal force as high as possible, the member 15 is provided with vanes 16, which are spirally disposed with the further object of assisting the upward current on the inner surface of the liquid.

It will be seen that if the valves 25, 53 and 57 are properly adjusted relatively to one another as described above, there will be no appreciable currents in the body of the liquid inside the rotor or through the slots 10. This allows the separation of the seeds to be effected solely by centrifugal force on the basis of their comparative specific gravities. The heavy seeds must be forced by centrifugal action to the periphery of the rotor shell and out through the slots 10 before they encounter any strong liquid current. Similarly the lighter seeds must be displaced to the inner surface of the liquid in the rotor before they can be carried out by the upward current there. In other words a zone is provided as free as possible from liquid currents wherein the separation is effected.

The disc 40 is provided in order to prevent the brine solution which may splash up through the chamber 23, coming in contact with the bearing 29.

The disc 41 is provided in order to throw any liquid that may pass up between the central tube 48 and the driven sleeve 14 clear into the trough 43, from whence it is discharged through the pipe 44 into the chamber 23, as above described.

Should any blockage of seeds occur in the pipe 48 it will be seen that as the liquid is being fed into the pipe 52 the seeds are being fed into the interior of the hopper 47 within the annular wall 49, the seeds will rise until they close the mouth of the spout 50, thus stopping the delivery of the seeds into the hopper. In such instance the liquid is prevented from overflowing the hopper by the provision of the pipe 46 which communicates at its top with the hopper and at its bottom with the cover 45 of the trough, permitting the overflow liquid to pass down the pipe 46, through the cover 45 into the trough 43, down through the discharge pipe 44 into the chamber 23 and thence out of the discharge pipe 24. The baffle plate 56 tends to stop the swirl of the liquid containing the heavier seeds when passing down through the discharge cock 57.

In the modified form of rotor illustrated in Figures 5 and 6 the downwardly moving liquid is carried by the tube 48, as above described, into the rotor. Such liquid containing the suspended seeds is now given a rotary motion by means of the vanes 61 and discharged through the discharge members 60 onto the dished plates 58. In this case the rotor is also filled with liquid as in the previous form, and as such rotor is revolved at a high speed the centrifugal action will force the heavier seeds out along the upper surfaces of the plates to their peripheries and against the sloping wall of the rotor and be forced down through the orifices 10 in the bottom 9 of the rotor as above described.

The lighter seeds on the other hand due to being of less specific gravity than the brine, are forced inwardly against the under surfaces of the plates and along these surfaces to the inner wall of the liquid, from whence they are delivered through the neck 13 by the liquid current as above described.

In this modification the conical member 15 is not required as the seeds are delivered by the discharge members 60 into the body of the liquid at a sufficient distance from the axis of the bowl to obtain the same effect as this member insures in the former construction. This particular construction of rotor has the following advantages:

Firstly. By separating the seeds into many thin layers instead of one layer the lighter seeds are enabled to free themselves more readily from the heavier seeds which usually form the larger proportion of the mixtures treated.

Secondly. As the movements of the light and heavy seeds under the influence of centrifugal force are radial, all the lighter seeds strike the under sides of the dished plates and move inward along these under surfaces, while the heavier seeds move outward along the upper surfaces. By thus providing separate paths for the movement of the light and heavy seeds through the body of the liquid the interference of individual seeds is avoided.

It will be apparent that the percentage of salt in the brine solution can be varied at will to make the solution more dense, or less dense as required for effecting different separations.

From the above description it will be seen that I have devised a simple and effective machine for separating heavy seeds from light seeds by centrifugal action on the basis of their comparative specific gravities, such machine effectively separating many kinds of weed seeds and other foreign matter from good seeds.

What I claim as my invention is:

1. In seed and grain separators, the combination with the casing adapted to be filled with liquid, of an enclosed hollow seed separating rotor, means for introducing liquid and the seeds or grain to be separated therein into the rotor, means for introducing liquid under pressure into the casing, adjustable discharge means at the bottom of said casing and adjustable means for feeding liquid into the casing.

2. In seed and grain separators, the combination with the casing adapted to be filled with liquid, of an enclosed hollow seed separating rotor, means for introducing liquid and the seeds or grain to be separated therein into the rotor, means for introducing liquid under pressure into the casing, adjustable discharge means at the bottom of said casing and adjustable means for feeding liquid into the casing at the same rate as it is discharged therefrom through the discharge means.

3. In seed and grain separators, the combination with the casing adapted to be filled with liquid, of an enclosed hollow seed separating rotor, means for introducing liquid and the seeds or grain to be separated therein into the rotor, means for introducing liquid under pressure into the casing, adjustable discharge means at the bottom of said casing, adjustable means for feeding liquid into the casing at the same rate as it is discharged therefrom through the discharge means and means for adjustably feeding the liquid into the rotor.

4. In seed and grain separators, the combination with the casing adapted to be filled with liquid, of an enclosed hollow seed separating rotor rotating in the liquid filled casing, said casing having a truncated conical upper portion and an inverted conical lower portion, a liquid inlet in the upper portion, adjustable discharge means in the bottom of the lower portion and a baffle plate in said lower portion.

5. In seed and grain separators, the combination with the liquid filled casing, of a rotor journalled in the casing, said rotor comprising a bottom with a central depressed portion constituting a liquid and seed receiving bowl, an outwardly extending flange surrounding the depressed portion and having discharge slots therethrough in the vicinity of the periphery thereof, a truncated conical cover extending over the rotor bottom and having an upper neck of reduced diameter and a vertically disposed baffle plate in said bowl.

6. In seed and grain separators, the combination with the liquid filled casing, of an enclosed bowl shaped rotor journalled in the casing, said rotor having a shell of truncated conical shape with an upper neck of reduced diameter and the bottom of said rotor having suitable discharge slots in the vicinity of its periphery, the bowl of said rotor terminating in an upwardly extending flaring flange and a centrally disposed conical member mounted above said bowl and inclined vanes on said conical member.

7. In seed and grain separators, the combination with the liquid filled casing, of an enclosed bowl-shaped rotor journalled in the casing, said rotor having a shell of truncated conical shape with an upper neck of reduced diameter and the bottom of said rotor having discharge slots in the vicinity of its periphery, the bowl of said rotor terminating in an upwardly extending flaring flange, a centrally disposed conical member mounted above said bowl, a liquid and seed inlet tube extending down through the conical member and into the bowl, a driving sleeve, radially disposed webs supporting said bowl on said driving sleeve and a vertically disposed baffle plate in said bowl.

8. In seed and grain separators, the combination with a liquid filled casing, of an enclosed bowl-shaped rotor journalled in the casing, said rotor having a shell of truncated conical shape with an upper neck of reduced diameter and the bottom of said rotor having arc-shaped discharge slots in the vicinity of the periphery thereof extending vertically therethrough.

9. In seed and grain separators, the combination with the liquid filled casing, of a rotor journalled in the casing, said rotor comprising a bottom with a central depressed portion constituting a liquid and seed receiving bowl, an outwardly extending flange surrounding the depressed portion and having discharge slots therethrough in the vicinity of the periphery thereof, a truncated conical cover extending over the rotor bottom and having an upper neck of reduced diameter and a liquid and seed inlet tube extending down freely through the reduced neck of the rotor cover and into the bowl.

10. In seed and grain separators, the combination with a liquid filled casing, of a rotor journalled in the casing, said rotor comprising a central depressed portion constituting a liquid and seed receiving bowl and an outwardly extending flange surrounding the depressed portion and a liquid and seed inlet tube extending down into the sleeve.

EDGAR DUNCOMBE EDDY.